(12) United States Patent
Townsend

(10) Patent No.: US 7,661,543 B1
(45) Date of Patent: Feb. 16, 2010

(54) HITCH DEVICE HOLDING ASSEMBLY

(75) Inventor: Christopher Townsend, 3411 Sigwalt St., Rolling Meadows, IL (US) 60008

(73) Assignee: Christopher Townsend, Rolling Meadows, IL (US)

( * ) Notice: Subject to any disclaimer, the term of this patent is extended or adjusted under 35 U.S.C. 154(b) by 279 days.

(21) Appl. No.: 11/543,509

(22) Filed: Oct. 5, 2006

Related U.S. Application Data

(63) Continuation-in-part of application No. 10/782,116, filed on Feb. 19, 2004, now abandoned.

(51) Int. Cl.
*E05B 73/00* (2006.01)
(52) U.S. Cl. .................... 211/4; 280/507; 280/491.1
(58) Field of Classification Search .............. 211/4
See application file for complete search history.

(56) References Cited

U.S. PATENT DOCUMENTS

| | | | |
|---|---|---|---|
| 4,711,106 A | 12/1987 | Johnson | |
| 5,497,927 A | 3/1996 | Peterson | |
| 5,682,998 A | 11/1997 | McCoy | |
| 6,070,441 A | 6/2000 | Bernstrom | |
| 6,527,292 B2 * | 3/2003 | Adair | 280/491.3 |
| 2002/0017770 A1 | 2/2002 | Parrish | |
| 2004/0156205 A1 | 8/2004 | Pisciotti | |

* cited by examiner

*Primary Examiner*—James Kramer
*Assistant Examiner*—Lindsay M. Maguire
(74) *Attorney, Agent, or Firm*—Harness, Dickey & Pierce, P.L.C.

(57) ABSTRACT

A hitch device holding assembly for organized and efficient storage of one or more hitch devices includes a panel adapted for being attached to a wall. One or more receiver hitches extend outwardly from the panel for receiving hitch devices. The hitch devices are secured by a pin extending through the hitch device and the receiver hitch of the invention.

20 Claims, 9 Drawing Sheets

HITCH DEVICE HOLDING ASSEMBLY

REFERENCE TO RELATED APPLICATION

This application is a continuation-in-part of application Ser. No. 10/782,116, filed Feb. 19, 2004 now abandoned.

BACKGROUND OF THE INVENTION

1. Field of the Invention

The present invention relates to trailer hitches and more particularly pertains to a new hitch device holding assembly for organized and efficient storage of one or more hitch devices.

2. Description of the Prior Art

The use of trailer hitches and storage devices is known in the prior art. U.S. Pat. No. 5,682,998 issued to McCoy et al. on Nov. 4, 1997 describes a system for packaging a trailer receiver hitch. U.S. Pat. No. 6,070,441 issued to Bernstrom on Jun. 6, 2000 discloses a trailer hitch security device. U.S. Pat. No. 5,497,927 issued to Peterson discloses a bicycle rack attachable to a receiver hitch.

While these devices fulfill their respective, particular objectives and requirements, the need remains for a system for storing and organizing one or more trailer hitch devices.

SUMMARY OF THE INVENTION

The present invention generally comprises a panel adapted for being attached to a wall. One or more receiver hitches extend outwardly from the panel for receiving hitch devices. The hitch devices are secured by a pin extending through the hitch device and the receiver hitch of the invention.

In another aspect of the invention, the hitch device storage assembly for storing a hitch device comprises a base for attachment to a wall and an arm extending from the base. The arm has a proximal end mounted on the base and a distal end extending away from the base. The assembly further includes a receiver tube for receiving a portion of the hitch device, with the receiver tube being mounted on the arm. The receiver tube is pivotable with respect to the arm, and the receiver tube has a first end with an opening for receiving a portion of the hitch device. The assembly also includes a mounting structure configured to mount the receiver tube on the arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
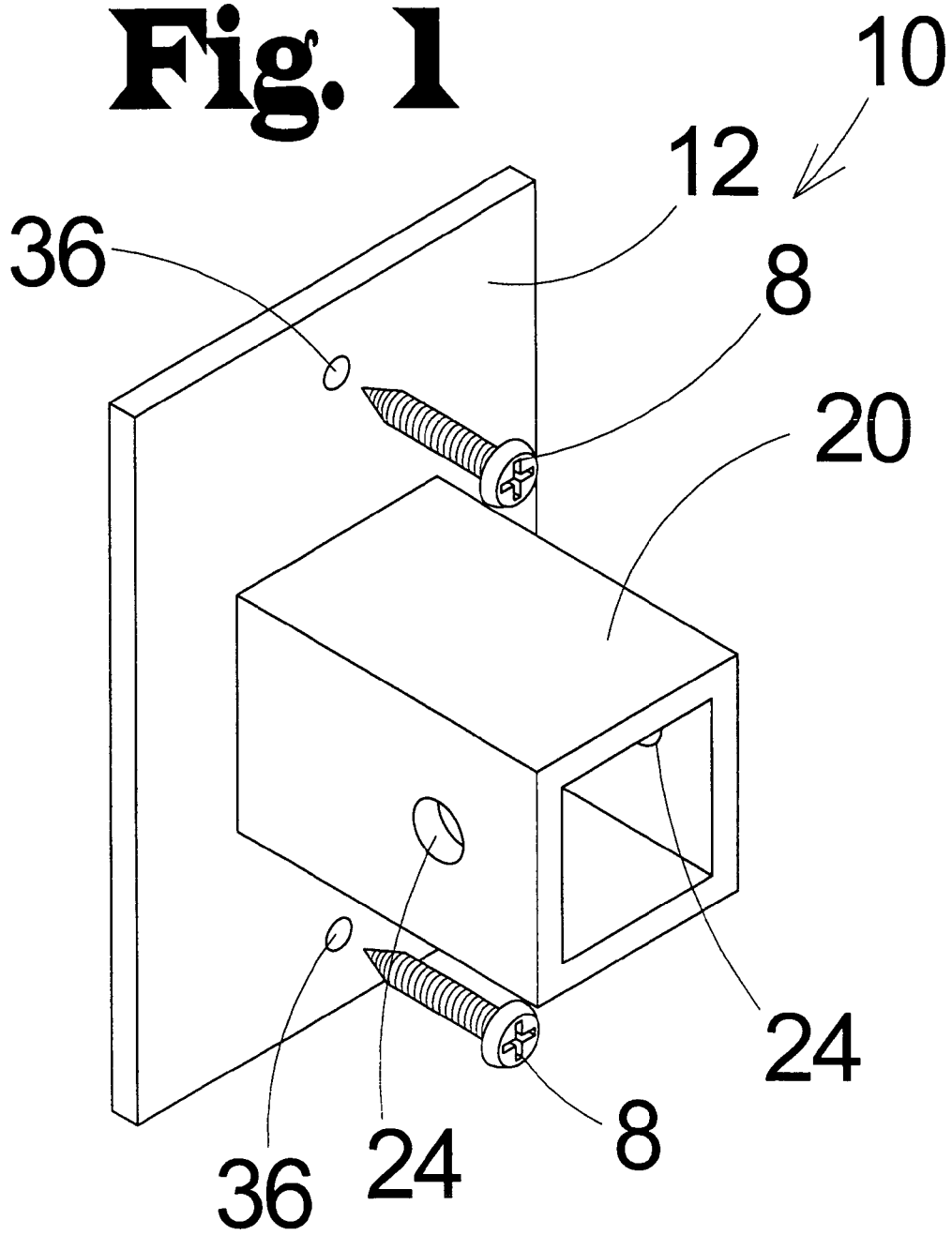
FIG. 1 is a perspective view of a new hitch device holding assembly according to the present invention.

With reference now to the drawings, and in particular to FIGS. 1 through 9 thereof, a new hitch device holding assembly embodying the principles and concepts of the present invention and generally designated by the reference numeral 10 will be described.

As best illustrated in FIGS. 1 through 6, a first embodiment of the hitch device holding assembly 10 for storing one or more hitch devices 2 generally comprises a panel 12 designed for attachment to a wall 4. One or more spaced receiver hitches 20 extend outwardly from the panel 12. Each receiver hitch 20 is designed for coupling to a respective one of the hitch devices 2 to be stored. A securing means 22 is provided for securing each hitch device 2 to a respective one of the plurality of receiver hitches 20. The securing means 22 includes aligned holes 24 extending through each receiver hitch 20. The aligned holes 24 are complimentary to apertures 6 in each respective hitch device 2. Each of the aligned holes 24 has a securing pin 26 insertable through the aligned holes 24 and apertures 6 whereby each hitch device 2 is secured to a respective hitch receiver 20.

In one embodiment, each securing pin 26 is generally L-shaped. A plurality of cotter pins 28 are provided. Each cotter pin 28 is insertable through an end 30 of a respective one of the securing pins 26 for inhibiting disengagement of the securing pin 26 from the hitch receiver 20.

Alternately, a plurality of locking mechanisms 32 are provided. Each locking mechanism 32 is selectively couplable to a respective one of the securing pins 26 for inhibiting disengagement of the securing pin 26 from the hitch receiver 20. Each locking mechanism 32 includes a removable key 34 for actuating the locking mechanism 32.

Figure 2:
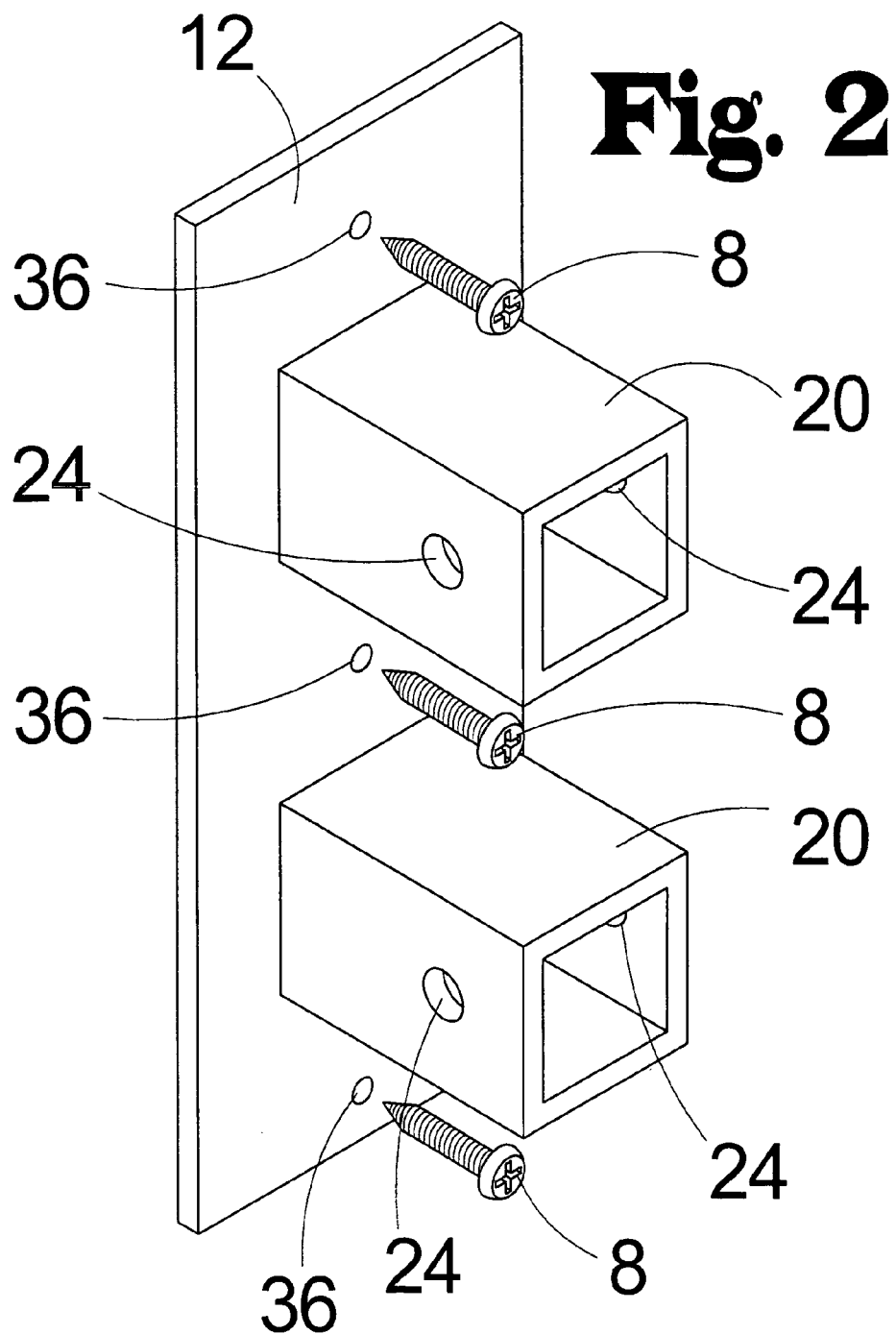
FIG. 2 is a perspective view of an alternative embodiment of the present invention.
Figure 3:
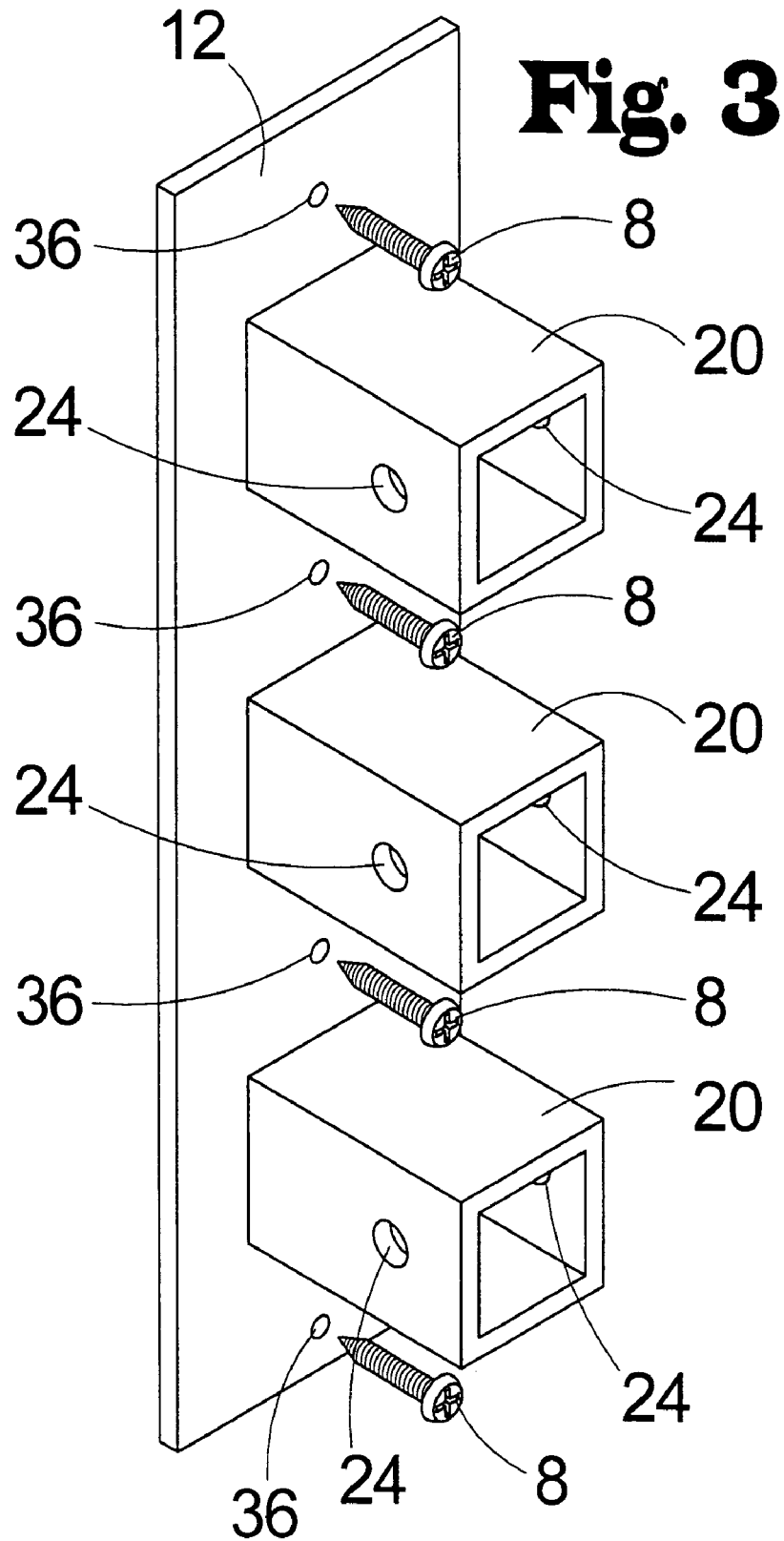
FIG. 3 is a perspective view of another alternative embodiment of the present invention.
Figure 4:
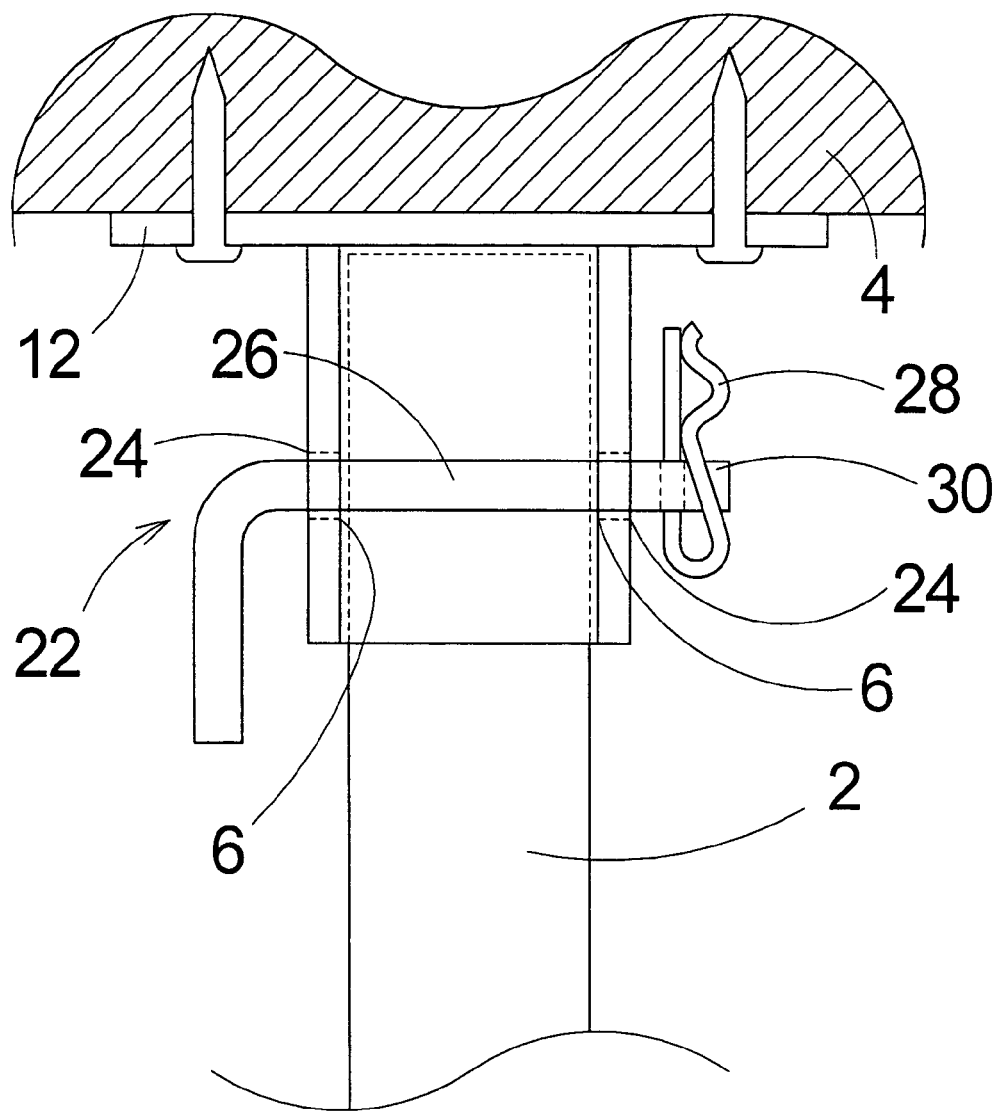
FIG. 4 is a top view of one embodiment of the securing pin of the present invention.
Figure 5:
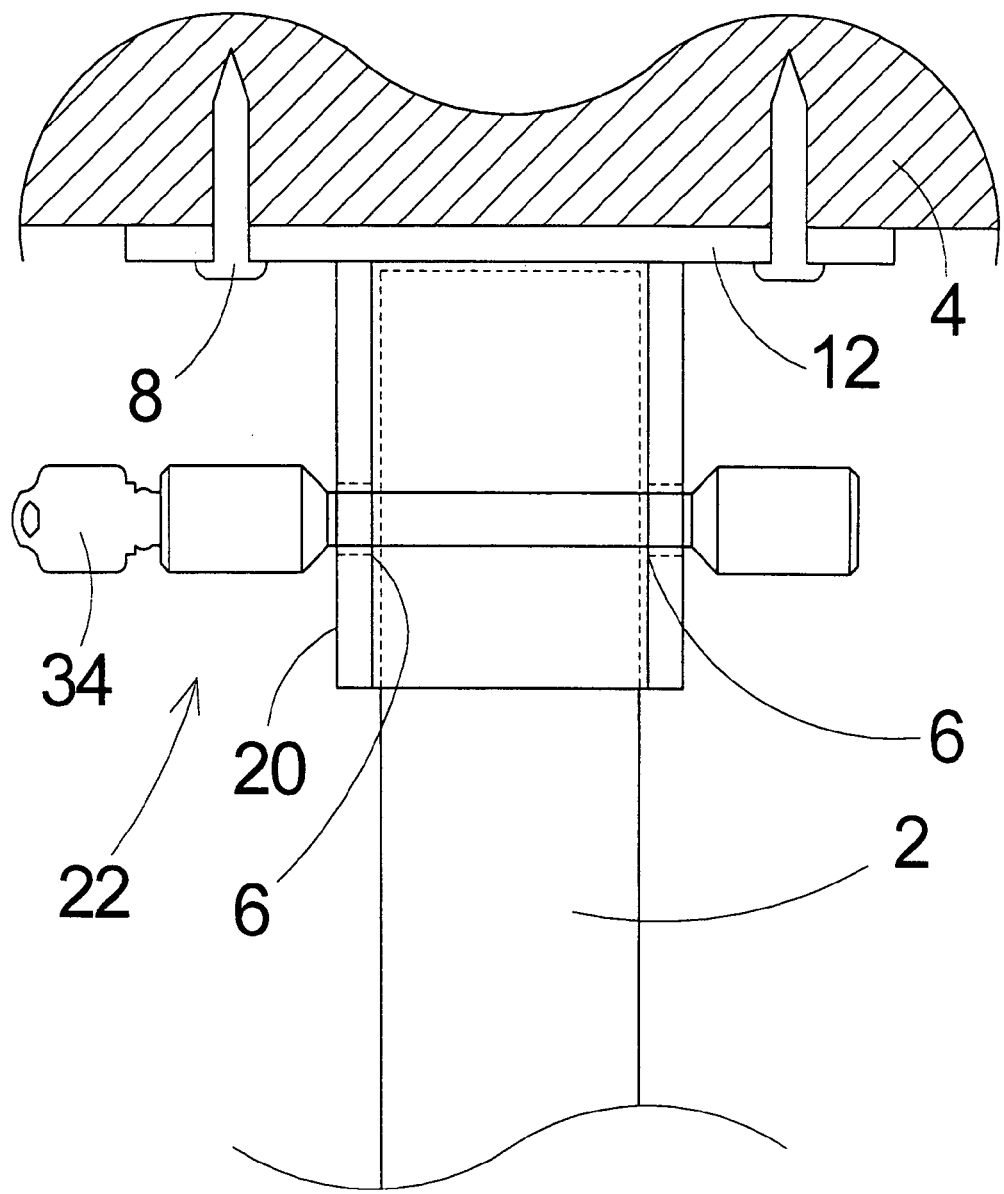
FIG. 5 is a top view of an alternative embodiment of the securing pin of the present invention.
Figure 6:
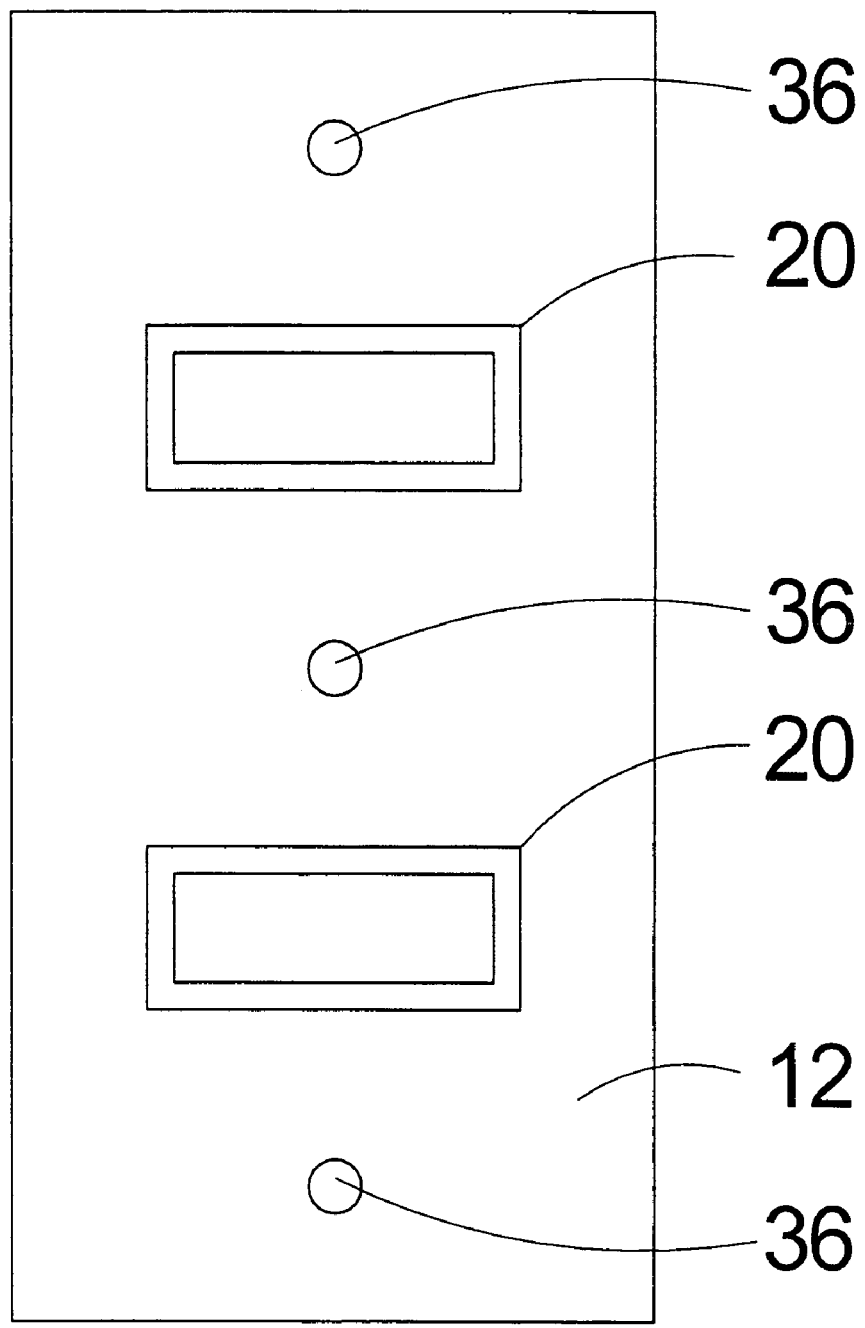
FIG. 6 is a front view of an alternative embodiment of the present invention.

A plurality of connection openings 36 extend through the panel 12 whereby the panel 12 is designed for being attached to the wall 4 using connectors 8 extending through the connection openings 36. The connection openings may be vertically aligned as shown in FIGS. 1 through 3, or arranged on either side of each receiver hitch as shown in FIGS. 4 and 5.

Conforming with conventional standardized hitch devices, each hitch receiver 20 is generally tubular having a generally rectangular cross-section. Each hitch receiver preferably extends about 4 inches from the panel. Each hitch receiver has a height and width of about two and a half inches. Alternately, each hitch receiver may have a height of about five eighths inches and a width of about 2 inches as shown approximately in FIG. 6.

In use, the invention is installed on a wall. As desired, hitch devices may be engaged to the hitch receivers extending from the panel where they are stored in an efficient organized fashion until needed. The securing pin is inserted through the receiver hitch extending from the panel. Depending on the style used, the securing pin is held in place by a cotter pin or a locking mechanism for greater security.

Figure 7:
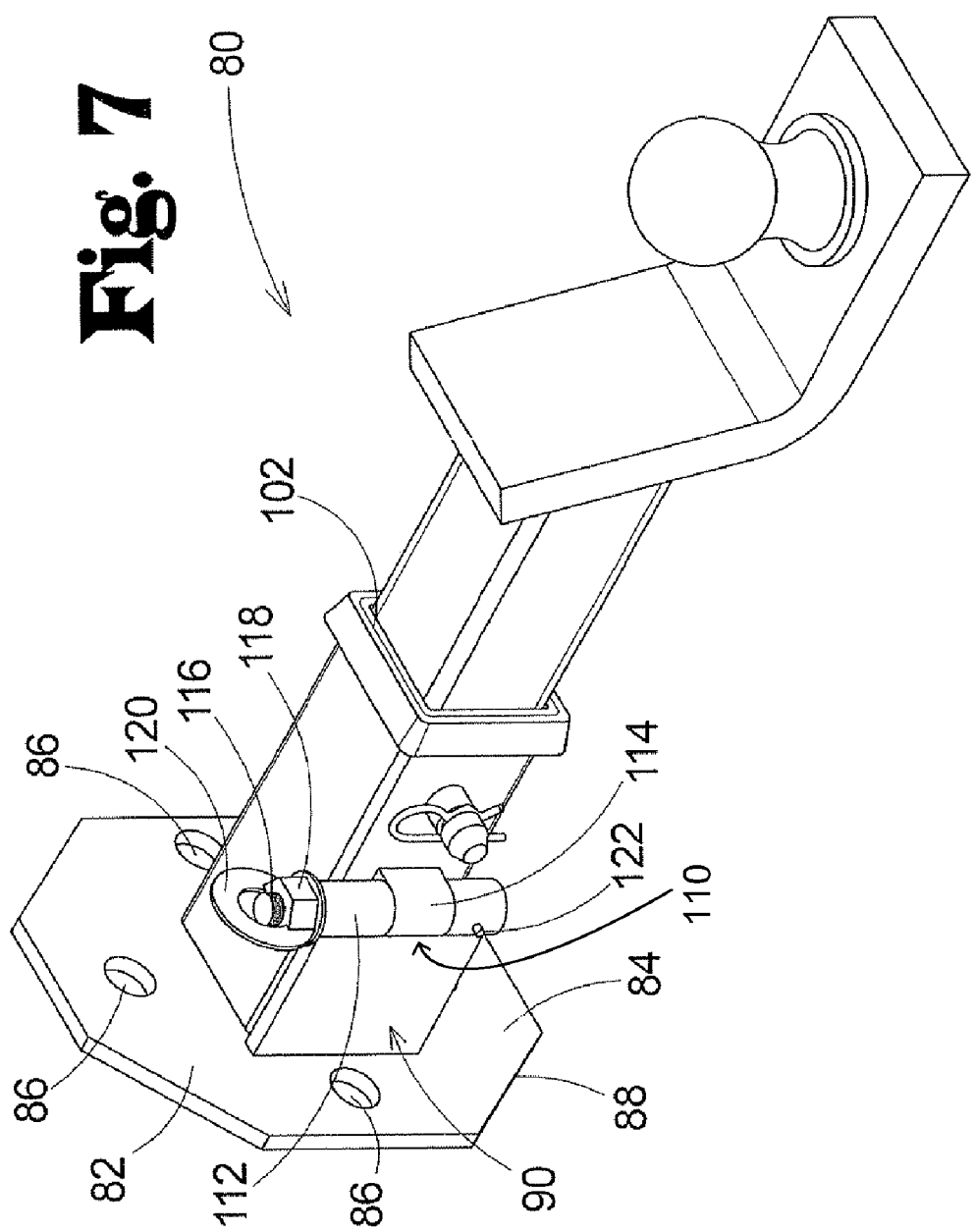
FIG. 7 is a perspective view of another embodiment of the present invention with the receiver tube in a first position.
Figure 8:
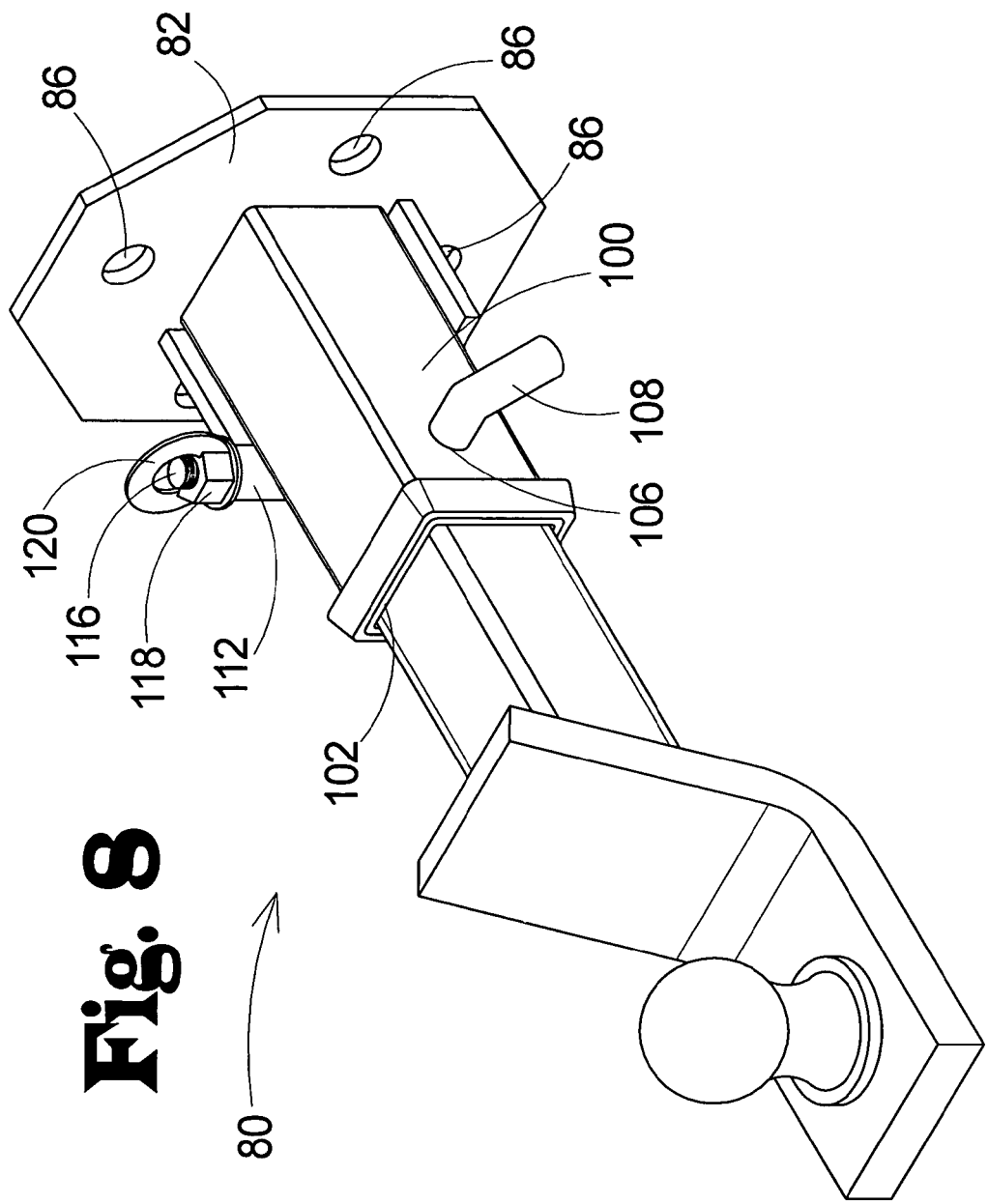
FIG. 8 is a second perspective view of the embodiment of FIG. 7 with the receiver tube in the first position.
Figure 9:
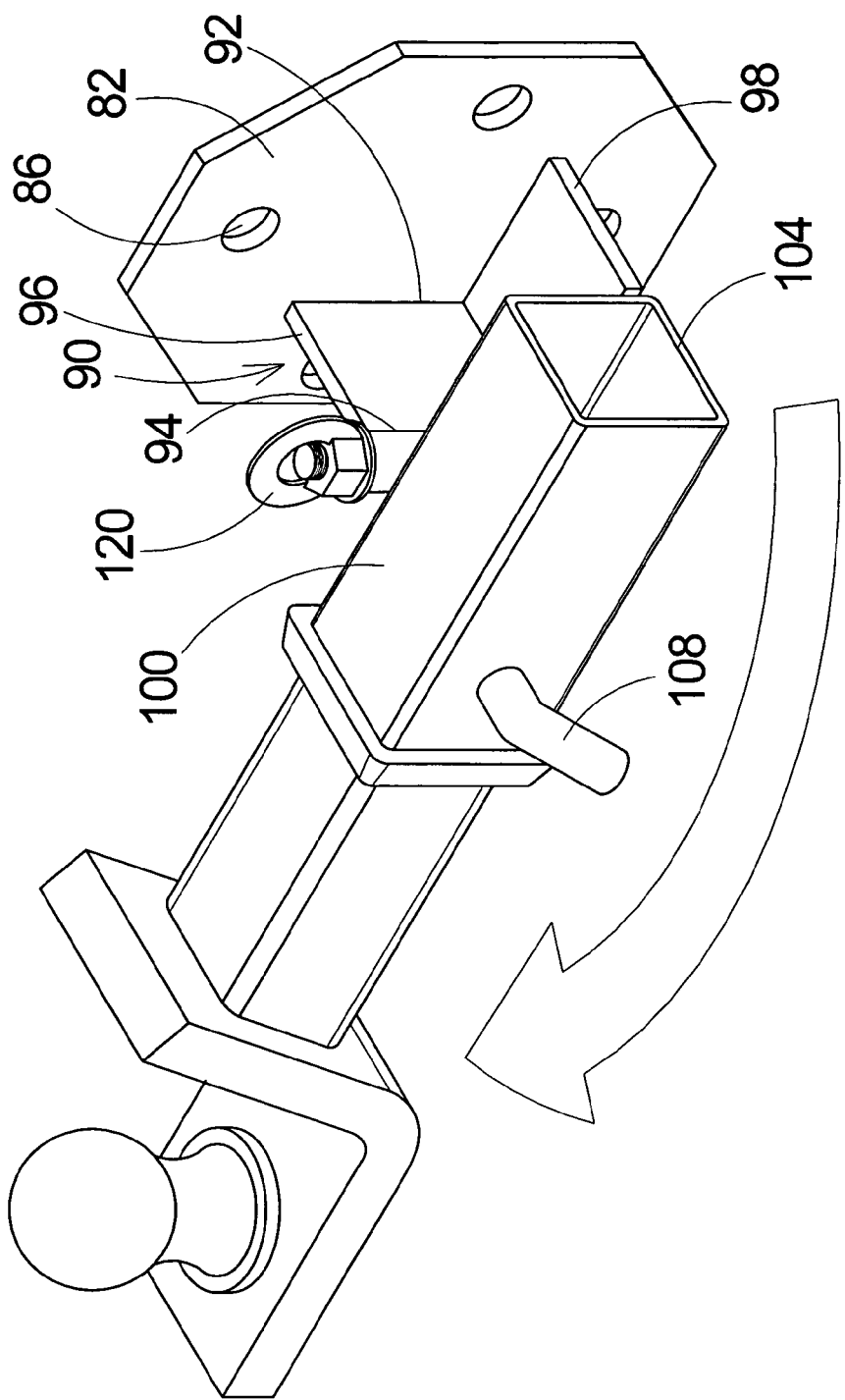
FIG. 9 is a perspective view of the embodiment of FIG. 7 with the receiver tube in a second position.

In another embodiment of the invention, shown in FIGS. 7 through 9, a hitch device storage assembly 80 according to the invention includes a base 82 for attachment to a wall. The base 82 has a front surface 84, and may have at least one mounting hole 86 for receiving a fastener therethrough. In some embodiments, the base 82 comprises a plate. The plate has a perimeter edge 88, which may have a hexagonal shape (although other shapes may also be employed).

The storage assembly 80 may include an arm 90 that extends from the base 82. The arm 90 may have a proximal end 92 that is mounted on the base 82 and a distal end 94 that extends away from the base. The arm 90 may extend substantially perpendicularly to the base 82, such as the front surface 84. The arm 90 may include a substantially-vertically oriented element 96, which in some embodiments may comprise a plate that lies in a substantially vertically-oriented plane. The arm 90 may also comprise a substantially horizontally-oriented element 98, which in some embodiments may lie in a substantially horizontal plane. In some embodiments of the arm 90, the substantially vertically-oriented element 96 and the substantially-horizontal element 98 may be connected together, such as to form a V-shaped channel oriented on its side.

The storage assembly 80 may further include a receiver tube 100 for receiving a portion of the hitch device. The receiver tube 100 may be mounted on the arm 90, and may be pivotable with respect to the arm. The receiver tube 100 may have a first end 102 with an opening for receiving a portion of the hitch device. The receiver tube 100 may be pivotable between a first position (see FIGS. 7 and 8) and a second position (see FIG. 9). The first position of the receiver tube 100 may be characterized by a longitudinal axis of the receiver tube being oriented substantially perpendicular to a line extending between the proximal 92 and distal 94 ends of the arm 90. The second position of the receiver tube 100 may be characterized by the longitudinal axis of the receiver tube being oriented substantially parallel to the line extending between the proximal and distal ends of the arm 90. The receiver tube 100 may be elongated, and a longitudinal axis of the receiver tube in the first position may be oriented substantially perpendicular to the longitudinal axis of the receiver tube in the second position. The first position of the receiver tube 100 may be further characterized by the receiver tube being positioned adjacent to a portion of the arm 90. The receiver tube 100 may be defined by a perimeter wall 104, and an aperture 106 may extend through opposite locations on the perimeter wall 104 of the receiver tube and configured to permit a securing bolt 108 to be inserted through the apertures 106 and a hitch device inserted in the receiver tube 100.

The hitch device storage assembly 80 may also include a mounting structure 110 for mounting the receiver tube 100 on the arm 90. In the illustrative embodiment, the mounting structure 110 may comprise a first tube 112 that is mounted on the arm 90, a second tube 114 that is mounted on the receiver tube 100, and a pin 116 that is inserted through the first tube 112 and the second tube 114 to join the first tube to the second tube in a pivoting relationship. At least a portion of an outer surface of the pin 116 may be threaded. The mounting structure may further include a securing member 118 that is mounted on the pin 116. The securing member 118 may include a passage with an interior surface of the passage being threaded for engaging threads on the pin such that rotation of the securing member on the pin tightens the securing member 118 on the pin 116 and tends to hold the relative positions of the first 112 and second 114 tubes. The securing member 118 may further include a loop 120 or other form of handle. In some embodiments, the securing member 118 comprises a nut. The mounting structure 110 may further include a set pin 122 that extends through the pin 116 and through one of the first 112 and second 114 tubes, to thereby prevent rotation of the pin 116 with respect to the tube through which it extends.

In this embodiment, the user of the storage assembly 80 is able to mount a hitch device on the assembly 80, such as when the receiver tube 100 is in the first position, and then the receiver tube may be pivoted into the second position for storage to minimize the extension of the hitch device into the room.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch device storage assembly for storing a hitch device, the hitch device storage assembly comprising:
    a base configured to be coupled to a wall;
    an arm extending from the base, the arm having a proximal end portion coupled to the base and a distal end portion extending away from the base;
    a receiver tube for receiving a portion of the hitch device, the receiver tube being coupled to the arm, the receiver tube being pivotable with respect to the arm, the receiver tube having a first end portion with an opening for receiving the portion of the hitch device;
    a mounting structure configured to couple the receiver tube to the arm to allow the pivoting movement of the receiver tube relative to the arm;
    wherein the mounting structure comprises:
    a first tube coupled to the arm;
    a second tube coupled to the receiver tube; and
    a pin configured to be inserted through the first tube and the second tube to allow pivoting movement of the second tube relative to the first tube and to thereby allow the pivoting movement of the receiver tube relative to the arm without removing the pin from either the first tube or the second tube.

2. The assembly of claim 1 wherein the arm comprises a substantially-vertically oriented element.

3. The assembly of claim 2 wherein the arm comprises a substantially horizontally-oriented element such that the substantially-vertically oriented element of the arm and the substantially horizontally-oriented element of the arm define a generally L-shape.

4. The assembly of claim 1 wherein the receiver tube is pivotable between at least a first position and a second position.

5. The assembly of claim 4 wherein the first position is characterized by a longitudinal axis of the receiver tube being oriented substantially perpendicular to a line extending between the proximal and distal end portions of the arm, and wherein the second position is characterized by the longitudinal axis of the receiver tube being oriented substantially parallel to the line extending between the proximal and distal end portions of the arm.

6. The assembly of claim 1 wherein the receiver tube includes a perimeter wall, an aperture extending through opposite locations of the perimeter wall of the receiver tube and configured to permit a securing bolt to be inserted through the apertures and a hitch device inserted in the receiver tube.

7. The assembly of claim 1 wherein the mounting structure further comprises a securing member configured to be coupled to the pin and operable to selectively compress the first tube against the second tube to resist the pivoting movement of the receiver tube relative to the arm.

8. The assembly of claim 7 wherein at least a portion of an outer surface of the pin is threaded, and the securing member includes a passage, an interior surface of the passage being threaded for engaging threads on the pin such that rotation of the securing member on the pin in a first direction tightens the securing member on the pin and operates to compress the first tube against the second tube.

9. The assembly of claim 8 wherein rotation of the securing member on the pin in a second direction generally opposite the first direction loosens the securing member on the pin to allow pivoting movement of the receiver tube relative to the arm without removing the securing member from the pin.

10. The assembly of claim 1 wherein the mounting structure additionally includes a set pin and an abutment structure, the set pin extending through the pin and through the abutment structure, the pin being operative to selectively compress one of the first tube and the second tube generally between the abutment structure and the other one of the first tube and the second tube to resist the pivoting movement of the receiver tube relative to the arm.

11. The assembly of claim 1, wherein the mounting structure is disposed along only a single side portion of the receiver tube to thereby allow the receiver tube to pivot relative to the arm about the mounting structure.

12. The assembly of claim 1, wherein the mounting structure includes a pin disposed adjacent only a single side portion of the receiver tube and configured to be coupled to the receiver tube and the arm to allow the pivoting movement of the receiver tube relative to the arm, and wherein the pin is configured to allow the pivoting movement of the receiver tube relative to the arm without being uncoupled from either the receiver tube or the arm.

13. A hitch device storage assembly for storing a hitch device when removed from a vehicle, the hitch device storage assembly comprising:
a base configured to be coupled to a wall, the base comprising a plate configuration;
an L-shaped arm having a substantially vertically oriented plate and a substantially horizontally oriented plate defining said L-shape of the arm, the substantially horizontally oriented plate of the arm and the substantially vertically oriented plate of the arm each extending generally perpendicularly from the base, the substantially vertically oriented plate of the arm having a proximal end portion coupled to the base and a distal end portion extending away from the base;
a receiver tube for receiving a portion of the hitch device, the receiver tube being coupled to the substantially vertically oriented plate of the arm, the receiver tube being pivotable with respect to the arm, the receiver tube having a first end portion with an opening for receiving the portion of the hitch device and a second end portion longitudinally opposite the first end portion; and
a mounting structure configured to couple the receiver tube to the distal end portion of the substantially vertically oriented plate of the arm, the mounting structure allowing the receiver tube to pivot relative to the arm about the distal end portion of the substantially vertically oriented plate of the arm;
wherein the receiver tube is pivotable between at least a first position and a second position;
wherein the second end portion of the receiver tube is disposed adjacent the base and a longitudinal axis of the receiver tube is oriented generally perpendicular to the base when the receiver tube is in the first position; and
wherein the substantially vertically oriented plate of the arm is positioned to allow the receiver tube to pivot away from the first position in a first rotational direction, and is positioned to inhibit the receiver tube from pivoting away from the first position in a second rotational direction opposite the first rotational direction.

14. The assembly of claim 13, wherein the distal end portion of the substantially vertically oriented plate of the arm defines an edge portion, the mounting structure being configured to couple the receiver tube to said edge portion of the vertically oriented plate of the arm to allow the receiver tube to pivot relative to the arm about said edge portion.

15. The assembly of claim 13, wherein the mounting structure is disposed along only a single side portion of the receiver tube and is adjustable between at least a first position in which the mounting structure frictionally resists pivoting movement of the receiver tube relative to the arm and a second position in which the mounting structure allows pivoting movement of the receiver tube relative to the arm.

16. The assembly of claim 15, wherein the mounting structure includes a first tube coupled to the distal end portion of the substantially vertically oriented plate of the arm, and a second tube coupled to the receiver tube such that the second tube can pivot relative to the first tube to allow the receiver tube to pivot relative to the arm, and wherein the second tube engages the first tube when the mounting structure is in the first position to frictionally resist pivoting movement of the receiver tube relative to the arm.

17. An assembly for storing a hitch when the hitch is removed from a vehicle, the assembly comprising:
a base configured to be coupled to a wall;
a receiver configured to receive at least part of a hitch for storing the hitch when removed from a vehicle;
a pin configured to couple the receiver to the base such that the receiver can pivot about the pin relative to the base; and
a securing member configured to be coupled to the pin and moveable relative to the pin;
wherein movement of the securing member relative to the pin in a first direction positions the securing member relative to the pin such that the pin and the securing member together operate to resist pivoting movement of the receiver relative to the base; and
wherein movement of the securing member relative to the pin in a second direction different from the first direction positions the securing member relative to the pin such that the pin and the securing member together operate to allow pivoting movement of the receiver relative to the base without removing the securing member from the pin.

18. The assembly of claim 17, wherein movement of the securing member relative to the pin in the first direction positions the securing member relative to the pin such that the pin and the securing member together operate to frictionally resist pivoting movement of the receiver relative to the base.

19. The assembly of claim 17, further comprising:

an arm extending from the base, the receiver being coupled to the arm to allow the receiver to pivot relative to the arm;

a first tube coupled to the arm; and a second tube coupled to the receiver such that the second tube can pivot relative to the first tube to thereby allow the receiver to pivot relative to the arm;

wherein movement of the securing member relative to the pin in the first direction positions the securing member relative to the pin such that the pin and the securing member together operate to compress the second tube against the first tube to resist the pivoting movement of the second tube relative to the first tube and to thereby resist the pivoting movement of the receiver relative to the arm.

20. The assembly of claim 17, wherein the base pin is disposed adjacent only a single side portion of the receiver.

\* \* \* \* \*